United States Patent

Shoji

[15] 3,659,158

[45] Apr. 25, 1972

[54] BULK-EFFECT SEMICONDUCTOR DEVICES AND CIRCUITS THEREFOR

[72] Inventor: Masakazu Shoji, Plainfield, N.J.

[73] Assignee: Bell Telephone Laboratories, Incorporated, Murray Hill, N.J.

[22] Filed: Aug. 25, 1969

[21] Appl. No.: 852,794

[52] U.S. Cl. ...................317/234 R, 317/234 V, 331/107 G, 307/271

[51] Int. Cl. ..........................................................H01l 9/00

[58] Field of Search...........................317/234 V; 331/107 G

[56] References Cited

UNITED STATES PATENTS 3,535,601 10/1970 Matsukura et al. ....................317/234
3,577,018 5/1971 Wada et al. ............................317/235
3,451,011 6/1969 Venohara ............................317/234

FOREIGN PATENTS OR APPLICATIONS 1,498,778 9/1967 France..................................317/234

*Primary Examiner*—Jerry D. Craig
*Attorney*—R. J. Guenther and Arthur J. Torsiglieri

[57] ABSTRACT

A wafer of bulk-effect material includes a first region contained between a first cathode and first anode and a second region contained between a second cathode and a second anode. The first and second cathodes and first and second anodes are resistively connected. A bias voltage nucleates a traveling electric field domain at the first cathode which, as it propagates in the first region, passes the second cathode where it nucleates a second domain in the second region. The output to the external circuit then has two frequency components derived from the first and second anodes.

2 Claims, 14 Drawing Figures

INVENTOR
M. SHOJI
BY
ATTORNEY

Patented April 25, 1972 3,659,158

3 Sheets-Sheet 3

BULK-EFFECT SEMICONDUCTOR DEVICES AND CIRCUITS THEREFOR

BACKGROUND OF THE INVENTION

This invention relates to bulk-effect differential negative resistance devices, and more particularly, to multi-terminal bulk-effect devices.

The patent of J. B. Gunn, U.S. Pat. No. 3,365,583, describes a family of bulk-effect devices, each comprising a wafer of appropriate semiconductor material such as gallium arsenide in which traveling domain oscillations can be excited through the application of a bias voltage above a prescribed threshold value. These traveling domains result from a known mechanism of electron transfer between conduction band valleys and are manifested by current pulses in the output terminals, now generally known as Gunn-effect oscillations.

The Gun patent teaches that a variety of effects can be achieved by using a Y-shaped wafer; for example, an electric field domain nucleated at a cathode can be made to follow two branches and impinge on separate anodes. In the patent of Uenohara, U.S. Pat. No. 3,451,011, wafer having two branches is used to obtain power amplification. One branch is of smaller cross section than the other and is used to control domain propagation in the large cross section branch. In any of these devices, however, the branches are of equal length and are not used to obtain a multiple frequency output.

SUMMARY OF THE INVENTION

An object of the present invention is to obtain a multiple frequency output from a bulk-effect device. As will be appreciated later, my device delivers an output having two frequency components having accurately determinable frequency and phase relationships. This is normally difficult to accomplish at the extremely high frequencies characteristic of bulk-effect oscillators.

This and other objects of the invention are attained in an illustrative embodiment of the type described in the Abstract of the Disclosure. As will be readily appreciated from the detailed description to follow, the output taken from the interconnected first and second anode contacts contains two frequency components in the form of interleaved pulses having a precisely determinable phase relationship determined largely by the device configuration.

These and other objects and features of the invention will be better understood from a consideration of the following detailed description taken in conjunction with the accompanying drawing.

DRAWING DESCRIPTION

FIG. 1 is a schematic illustration of one embodiment of the invention;

FIG. 2 further illustrates part of the embodiment of FIG. 1;

FIGS. 3A through 3H are graphical representations of potential distribution at different instants of time in the wafer of the device of FIG. 2;

DETAILED DESCRIPTION

Figure 1:
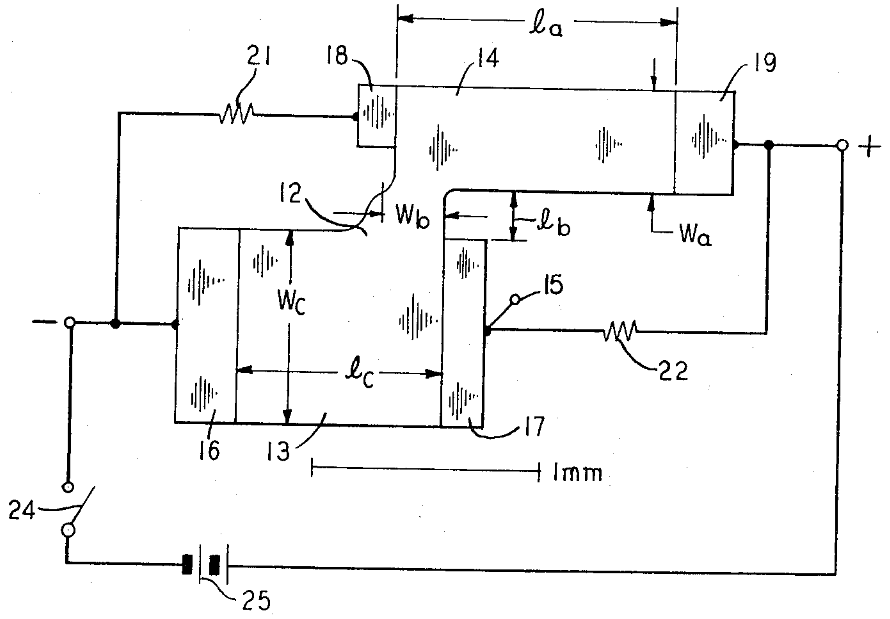

Referring now to FIG. 1, there is shown a circuit for generating a microwave output having two frequency components which includes a bulk-effect wafer 12 having a first region 13 and a second region 14. Region 13 is contained between a first cathode 16 and a first anode 17 while the second region 14 is contained between a second cathode 18 and a second anode 19. The cathodes 16 and 18 are interconnected by a first resistor 21 and the anodes 17 and 19 are connected by a second resistor 22. The wafer 12 is made of an appropriate bulk-effect or "two-valley" material such as substantially homogeneous N-type gallium arsenide having a doping concentration of about $10^{14}-10^{15}$ cm$^{-3}$.

As is known, when a sufficient voltage is applied across a wafer of bulk-effect material, a high electric field domain will be formed due to the excitation of majority carriers from a lower energy band valley of relatively high mobility to a higher energy band valley of lower mobility. The initial nucleation of this domain will normally take place at some region of discontinuity such as the cathode contact and will propagate in the direction of the anode contact.

Upon closure of a switch 24, a battery 25 is connected between the first cathode contact 16 and the second anode contact 19. In accordance with the invention, resistors 21 and 22 are designed such that battery 25 places a sufficient voltage across wafer region 13 to cause nucleation of a traveling domain, but insufficient voltage across region 14 to cause such nucleation. The electric field lines extending between contacts 16 and 17 are almost parallel, and the nucleation of a traveling domain at cathode contacts 16 upon closure of switch 24 occurs in the same manner as in the Gunn-effect oscillator. When the traveling domain passes the second cathode 18 on its way to anode 17, it perturbs the electric field configuration near the cathode 18 to cause a second domain nucleation. The second domain, having been formed, then propagates independently toward the second anode contact 19. After the first traveling domain is extinguished at anode 17, a new domain is immediately formed at cathode 16 just as it would in conventional Gunn-effect oscillators. The process of course repeats itself with domains originating at cathode 16 being extinguished at anode 17 and those originating at cathode 18 being extinguished at anode 19. A multiple frequency output waveform is generated between node 15, which is connected to anode 17, and a suitable point of fixed potential such as anode 19.

The frequency of pulses generated at anode 17 are primarily dependent on the length $l_c$ of wafer region 13, while the frequency of pulses generated at the second anode 19 are a function of the length $l_a$ of wafer region 14. The pulsed output appearing at the external circuit therefore contains two frequency components, one dependent on the length of region 13 and the other on the length of region 14. It is clear that the relative frequency and phase of the two components can be precisely tailored to be within highly accurate tolerances which, as mentioned before, are useful in microwave frequency time division pulse code modulation (PCM) systems.

In order for the device to work as intended, it is important that both the intensity and configuration of the electric field between contacts 18 and 19 be designed such that the local disturbance caused by a domain in region 13 will trigger a domain in region 14, but the field must not be so large as to cause spontaneous nucleation of domains in region 14. As a practical matter, this requires that a stationary electric field layer be formed at contact 18 which can be triggered into a traveling domain by a slight electric field disruption. The electric field throughout region 14 is at all times sufficiently high to prevent quenching of any domain that forms. This voltage value is known in the art as the domain sustaining voltage $V_D$.

Figure 2:
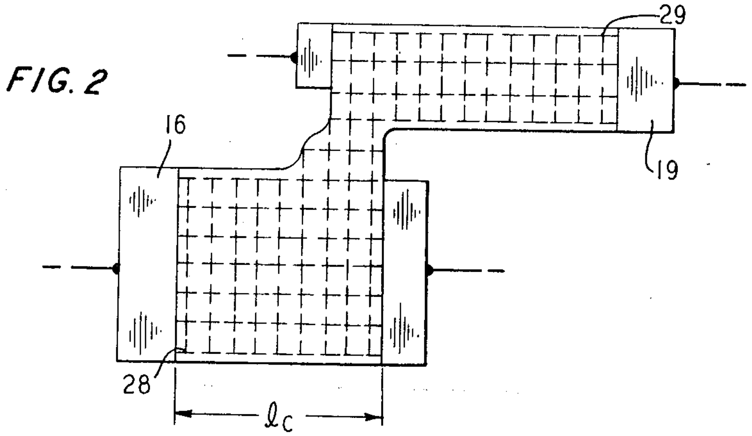

FIG. 2 shows the device of FIG. 1 in which a reference coordinate grid has been superimposed. FIGS. 3A through 3H show the potential field at each of the coordinate points of the wafer; that is, the height of each point designates electric field potential at the wafer coordinate directly below the point. For purposes of reference, sample coordinates 28 and 29, respectively adjacent the first cathode 16 and the second anode 19, are shown both in FIGS. 2 and 3A, 3D and 3H. The voltage at second anode 19 is taken as the zero reference; the voltage at point 29 is therefore zero in all of the FIG. 3 graphs.

Figure 3A:
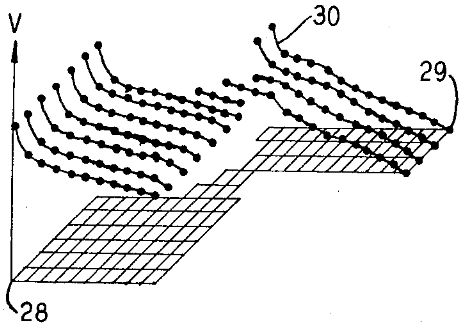
Figure 3B:
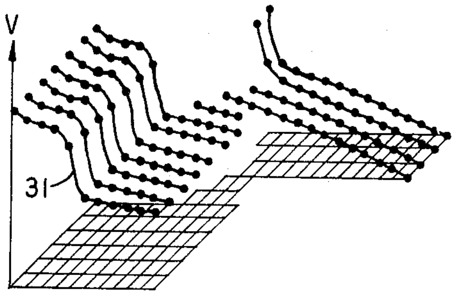
Figure 3C:
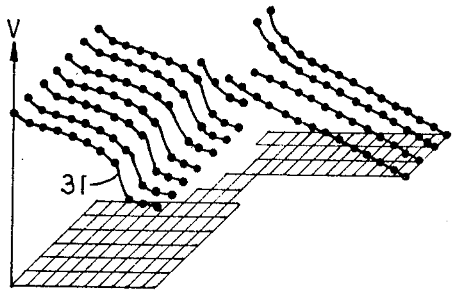
Figure 3D:
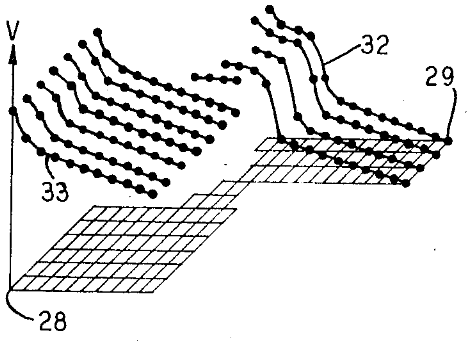
Figure 3E:
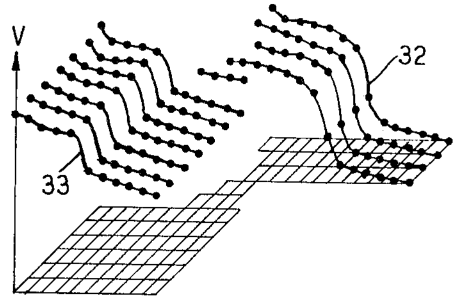
Figure 3E:
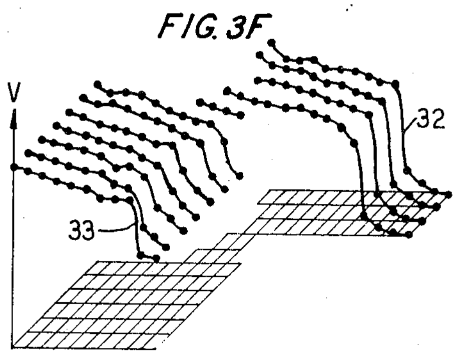
Figure 3G:
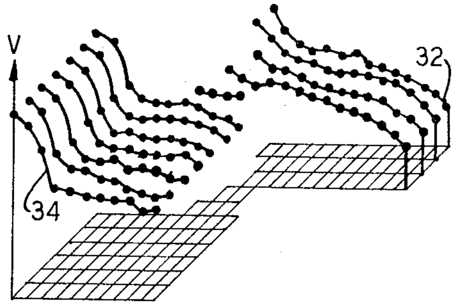
Figure 3H:
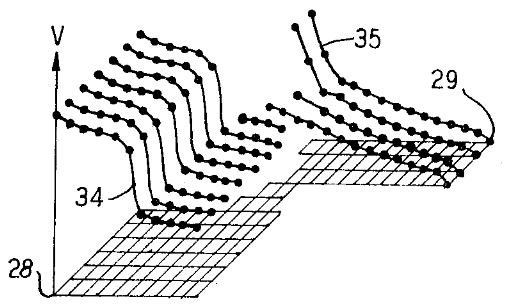

Each of the graphs designate successive instants of time. FIG. 3A shows a voltage distribution just before a domain in region 13 has been nucleated. Notice that a stationary high field layer 30 exists near the second cathode contacts. FIG. 3B shows the newly-formed traveling domain 31. FIG. 3C shows the domain at a subsequent instant of time. In FIG. 3D domain 31 has been extinguished at the first anode, and has triggered a domain 32 in the second wafer portion. Meanwhile, a new domain 33 is forming in the cathode of the first wafer region. In FIGS. 3E and 3F, domains 32 and 33 continue propagating toward their respective anodes. In FIG. 3G, domain 33 has been extinguished. A new domain 34 is being formed, and domain 32 is impinging on the second anode. In FIG. 3H, domain 34 continues propagation and a new stationary high-field layer 35 has formed at the second cathode.

The apparatus of FIGS. 1 and 2 has been successfully built and tested. The drawing of FIG. 2 is to scale with each rectangle of the grid representing a 4 mil by 5 mil area of the actual wafer. The device thickness was 10 mils and the wafer material was N-type gallium arsenide built to a resistivity of 1.7 ohm-centimeters. The resistance of resistor 21 was 177 ohms, the resistance of resistor 22 was 173 ohms, and the voltage applied across the device by battery 25 was 600 volts.

Figure 4:
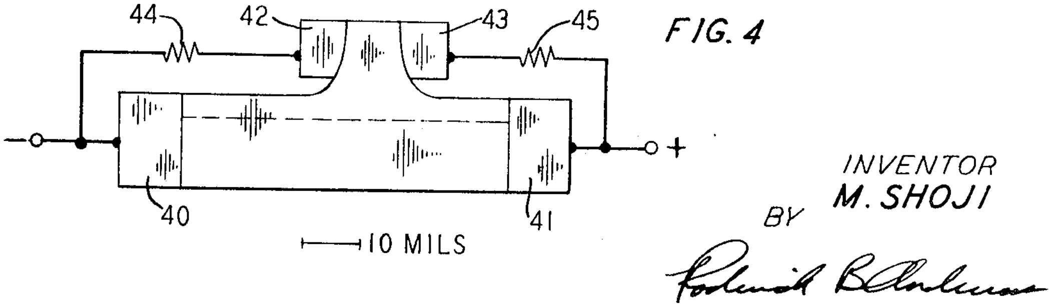
FIG. 4 is a schematic illustration of another embodiment of the invention.

Another embodiment of the device which has been successfully built and tested is illustrated in FIG. 4. The FIG. 4 device operates in the same manner as described before; that is, traveling domains are successively nucleated at a first cathode contact 40 which produce a pulse output at a first anode 41. As each traveling domain passes a second cathode 42, a domain is formed in a second wafer portion which in turn impinges on the anode 41. The scale of 10 mils is shown in the figure, and the wafer thickness was 10 mils. Resistor 44 was 340 ohms, and resistor 45 was 290 ohms.

A more detailed analysis of the theoretical aspects of the invention, which will assist one skilled in the art to design embodiments other than those explicitly described, is given in the attached Appendix. From these considerations it will be clear that numerous embodiments and modifications other than those specifically described may be made by those skilled in the art without departing from the spirit and scope of the invention.

APPENDIX

Figure 5:
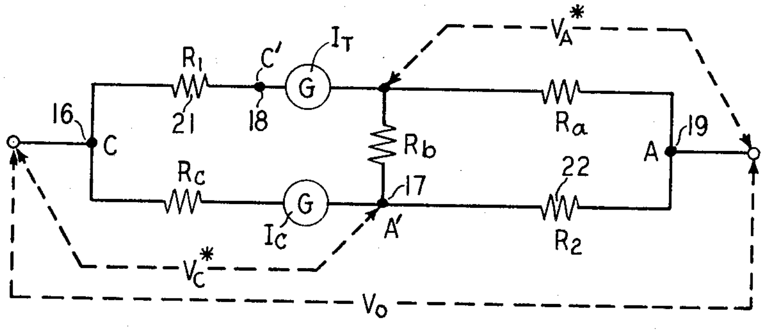
FIGS. 5 through 7 are equivalent circuits included for the purpose of illustrating certain principles of operation of the FIG. 1 embodiment.

In the analysis of device operation, an equivalent circuit approach may be utilized. During the first part of the oscillation period when a single domain travels between the electrodes C and A′, the equivalent circuit is shown in FIG. 5. The resistance $R_a$ is given by $R_a = l_a/\sigma h W_a$, where $W_a$, $l_a$ and $h$ are the width, the length and the thickness of the bulk as defined in FIG. 1. $R_b$ and $R_c$ can be found by changing the suffix in the formula to $b$ and $c$ and substituting from the device dimensions defined in FIG. 1. A high-field domain is equivalent to a constant current generator $I_c$ given by $I_c = (\sigma E_o) W_c h$, where $E_o$ is the outside field of a saturated domain. The stationary layer 30 at the contact 18 is represented by another current generator $I_T$. By analyzing the equivalent circuit of FIG. 5 we obtain $$V_c^* = V_0 - \frac{R_2(R_a+R_b)I_c + R_2 R_a I_T}{R_a+R_b+R_2} \qquad (1)$$

where $V^*_c$ is the voltage developed between electrodes C and A′. The result is valid when the following conditions are satisfied.

$$V_c^* + R_b\left(I_c - \frac{V_0 - V_c^*}{R_2}\right) \geq R_1 I_T. \qquad (2)$$

Figure 6:
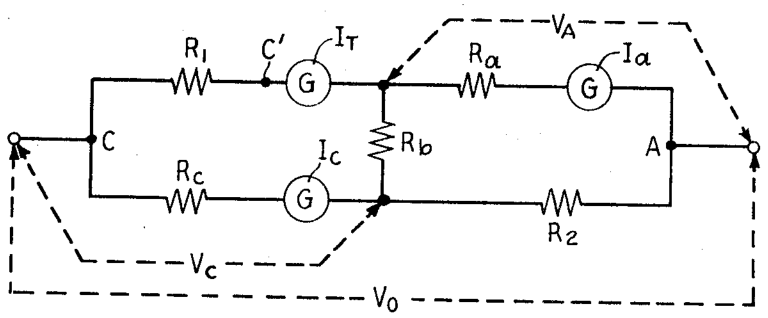
Figure 7:
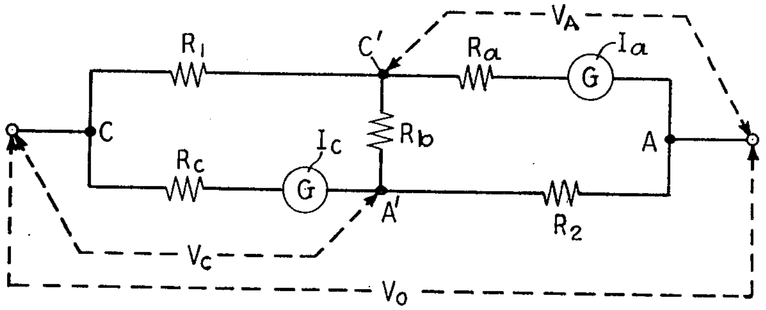

The first and the second inequalities insure that the voltages sustained by the domain and the high-field layer, respectively, are positive. When the applied voltage $V_o$ is high enough to insure that the first inequality holds, then the second inequality usually holds automatically. In other words, the high-field layer always exists when only one domain exists in the device. When there are two domains in the device, however, the high-field layer may or may not exist. FIG. 6 shows the equivalent circuit when the layer does exist and FIG. 7 the circuit when it does not. The domain between electrodes C′ and A is represented by a current generator $I_a$ defined by $I_a = (\sigma E_o) W_a h$. We obtain the following results when the layer exists:

$$V_c = V_o - R_2(I_c + I_T - I_a) \qquad (3)$$
$$V_a = (R_2 + R_b)(I_T - I_a) + R_2 I_c$$

where $V_c$ is the voltage developed across electrodes C and A′ and $V_a$ is the voltage between electrodes C′ and A minus the voltage sustained by the high-field layer. This result is valid subject to the condition $$V_c \geq R_c I_c,\ V_a \geq R_a I_a,\ (4)\ V_c + R_b(I_a - I_T) \geq R_1 I_T.$$

When the high-field layer does not exist we obtain, $$V_c = \frac{(R_1+R_b)V_0 - R_2\{R_b I_c + R_1(I_c - I_a)\}}{R_1+R_2+R_b}$$

$$V_a = \frac{(R_2+R_b)V_0 - R_1\{R_b I_a + R_2(I_a - I_c)\}}{R_1+R_2+R_b} \qquad (5)$$

under the requirement that $$V_c \geq R_c I_c,\ V_a = R_a I_a$$

$$V_c + R_b\left(I_c - \frac{V_0 - V_c}{R_2}\right) < R_1 I_T. \qquad (6)$$

For a given set of values for the resistances and currents we can find which of the two cases occurs by directly checking which of the inequalities, (4) or (6), is valid. The set of values applicable to the experiment of FIGS. 1 and 2 are as follows:

| | |
|---|---|
| $V_o$ = 600 volts | $R_a$ = 205 ohms |
| $I_a$ = 0.91 amperes | $R_b$ = 72 ohms |
| $I_c$ = 2.05 amperes | $R_c$ = 68 ohms |
| $I_T$ = 0.91 amperes | $R_1$ = 177 ohms |
| | $R_2$ = 173 ohms |

Utilizing these values we obtain $V^*_c$ = 310 volts. The inequalities in (2) are satisfied. Equation (3) gives $V_c$ = 245 volts and $V_a$ = 355 volts which satisfies inequality (4). On the other hand, we obtain $V_c$ = 211 volts and $V_a$ = 403 volts from Eq. (5). These values, however, do not satisfy the inequalities in (6), indicating that the assumption of no stationary high-field layer is invalid. Suppose that a domain is nucleated at the cathode 16 at time $t = 0$. The domain takes $l_c/v_o$ seconds to reach electrode A′, where $v_o$ is the velocity of the domain. Utilizing $l_c = 0.09$ cm and $v_o = 7.5\times10^6$ cm·sec$^{-1}$, $l_c/v_o = 12$ nsec. During this time the voltage of electrode A is equal to 310 volts. At the end of this first half period two domains appear in the device and the voltage of the electrode switches to $V_c$ = 245 volts. This voltage remains constant until the domains annihilate at their respective anodes.

I claim:

1. An automatic multiple frequency generator comprising a negative resistance device comprising:

a wafer of bulk-effect semiconductor material having a first region contained between a first cathode and a first anode and a second region contained between a second cathode and a second anode;

the second cathode being located between the first cathode and first anode and being contiguous to part of the first region;

the first anode being located between the second cathode and second anode;

means for applying between the second cathode and second anode a voltage below the value required for spontaneously establishing Gunn-effect oscillations in the second region, but sufficiently near said value such that a first domain in the first region triggers a second domain in the second region as the first domain travels past the second cathode;

said second region being of sufficient length such that a second traveling domain from the second cathode is not extinguished at said second anode until the first domain in the first region is extinguished at the first anode and another domain starts to propagate in the first region;

means for applying sufficient voltage to the first cathode and first anode to establish Gunn-effect oscillations in the first region, said oscillations being characterized by the formation at the first cathode and propagation toward the first anode of successive traveling electric field domains; and output means coupled to said first anode.

2. The device of claim 1 wherein the first and second cathodes are resistively connected and the first and second anodes are resistively connected.

* * * * *